Oct. 10, 1944.   C. L. POPP   2,360,011
MOLD FOR PLASTIC MATERIALS
Filed Aug. 3, 1940   3 Sheets-Sheet 1

INVENTOR
CHARLES L. POPP
BY
*Hyde and Meyer*
ATTORNEYS

Oct. 10, 1944.  C. L. POPP  2,360,011
MOLD FOR PLASTIC MATERIALS
Filed Aug. 3, 1940   3 Sheets-Sheet 2

INVENTOR
CHARLES L. POPP
BY
Hyde and Meyer
ATTORNEYS

Oct. 10, 1944.  C. L. POPP  2,360,011
MOLD FOR PLASTIC MATERIALS
Filed Aug. 3, 1940  3 Sheets-Sheet 3

INVENTOR
CHARLES L. POPP
BY
*Hyde and Meyer*
ATTORNEYS

Patented Oct. 10, 1944

2,360,011

UNITED STATES PATENT OFFICE 2,360,011

MOLD FOR PLASTIC MATERIALS

Charles L. Popp, St. Clair, Mich., assignor to The Standard Products Company, Port Clinton, Ohio, a corporation of Ohio Application August 3, 1940, Serial No. 350,726

3 Claims. (Cl. 18—42)

The invention relates to an improved apparatus for molding articles from thermoplastic material. It is particularly concerned with improvements in the apparatus used for injecting the molding material into the molding cavity and thereafter removing the molded article from said cavity.

As is well known to those skilled in the art, one of the problems arising in connection with the use of metal dies or molds is the proper design of sprue or gating arrangement which will supply an adequate quantity of molding material to the casting cavity, without subsequently interfering with the opening of the mold sections or removal of the molded article from the cavity. This problem has usually been solved by cutting the sprue cavity along one of the parting planes of the mold sections so that when the mold sections are separated after solidification of the molded article, the solidified gating material and casting may be removed as a unit and the casting may subsequently be trimmed and finished at the point of entry of the gate.

In an attempt to apply this gating arrangement to specific articles, difficulties sometimes arise by reason of the character and surface contour of the article itself. Certain surface portions of the article may be designed or finished in such a way that it is distinctly undesirable to feed the casting material therethrough since eventual trimming of the gating material therefrom may be quite difficult so as to render commercial production of the article both time consuming and expensive. The basic method of feeding molding material into a convenient surface through the parting plane of the mold may therefore present obstacles which in some cases are apparently insurmountable so as to require either redesign of the article, a change in the method of manufacture, or an expensive finishing operation on the article itself.

Again, certain articles may have undercuts in their surfaces which makes it difficult or impossible, after the articles have solidified, to manipulate the dies or remove the articles therefrom.

It is accordingly an object of the present invention to provide novel and improved means for molding articles in permanent molds or dies whereby the molding material may be injected, by pressure or gravity into surface areas not heretofore regarded as practically accessible in the permanent molding art.

Another object is to devise apparatus for molding of articles having undercuts on their outer surfaces.

For purpose of illustration only, and with no intention that the example be restrictive, I shall describe the invention as applied to the pressure molding of a ring member for a water spray adapter used in a bathroom shower nozzle. As the description proceeds it will be instantly apparent that the objects and advantages of the invention can be exemplified in other articles where it might be desirable to preserve unimpaired certain exterior accuracy of configuration, for instance on gears or pinions the structural requirements of which permit the use of a molding operation in a permanent mold. For a detailed description of my invention attention is directed to the attached drawings in which Fig. 1 is a perspective view of a shower nozzle ring such as mentioned hereinabove after removal from the die, seven similar rings having been broken away, for simplicity in illustration.

Figure 1:
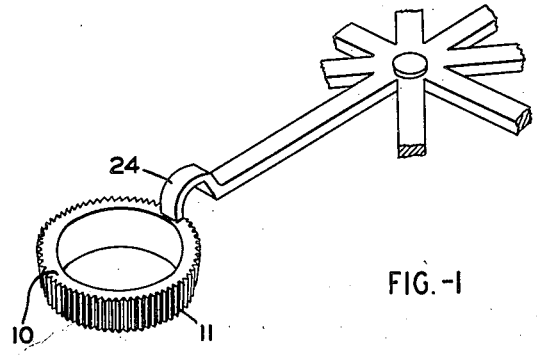

In Fig. 1 there is illustrated an article of annular contour 10, having upon its external peripheral face a succession of spaced grooves 11 extending completely around the periphery. The article shown is preferably made from thermoplastic material, for instance from a well known organic ester such as cellulose acetate. The showing is for illustration only since any one of a multiplicity of articles might exemplify the invention provided that they have a common characteristic, namely a working surface positioned to receive an in-gate under conventional molding practice, but which for one reason or another should be protected from certain troublesome after effects of said conventional molding practice, such as the subsequent cleaning away of the gate material. In the present instance, since the annulus shown is an element in a concentric assembly for a shower bath nozzle and since it is desirable that the minute streams of water issuing from each of said grooves should be of even dimension and should present a regular and unwavering pattern, it would be a painstaking, time consuming, and expansive undertaking to clean away the gating material from the peripheral grooves at the point of entry of the gate. It nevertheless greatly simplifies the matter of mold design to mold the illustrated article in a unit group such as intended in Fig. 1 (all the elements save one being broken away) and in such a case the only practicable method of molding involving the least number of die sections requires the die cavity to be cut into the meeting faces of two die sections at their parting plane. Under such conditions the sprue is generally centrally located and a plurality of generally radially disposed fluid passages connect with a respective number of die cavities. While thus illustrated the invention of course is applicable to the making of articles in a single cavity die, although its economic aspects are particularly impressive when articles are made in multiple, as herein described.

Figs. 2, 3, 4 and 5 illustrate my preferred apparatus comprising cooperating die halves 12 and 13. Casting cavities 14 are recessed in die member 13, and corresponding projections 15 form raised portions on the matched surface of die member 12 as will be familiar to those skilled in the art. Said die members 12 and 13 are conventionally mounted on the platens of a standard press (not shown) so as to be reciprocable into and out of working engagement as is also well known in the art, and said die members may similarly be provided on their working faces with pilot members to insure accurate alignment and with offsets in the neighborhood of the casting cavities to seal the escape of plastic material.

The gating arrangement which specifically embodies my invention will now be described. The plastic material enters the die through a concavity 16 which matches an injection nozzle, not shown, communicating with a pressure cylinder, also not shown, or other source of supply. Thereafter the material proceeds through a passage 17 in die 13, which passage flares outwardly at 18 at the meeting plane of the dies. Thence the material flows through radially directed gates 19 towards casting cavities 14.

Figure 2:
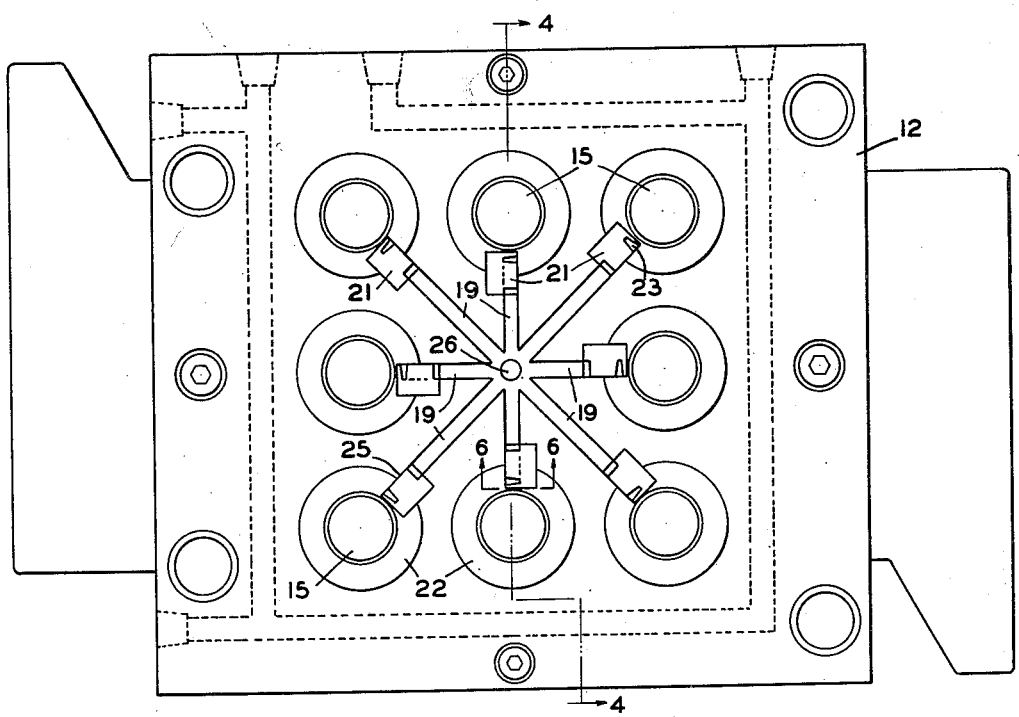
Fig. 2 is a plan view, from above, of one half of a die assembly for simultaneously molding eight rings such as shown in Fig. 1.
Figure 6:
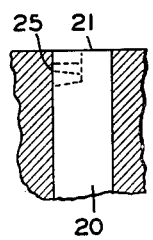
Fig. 6 is a section taken on the line 6—6 of Fig 2.
Figure 3:
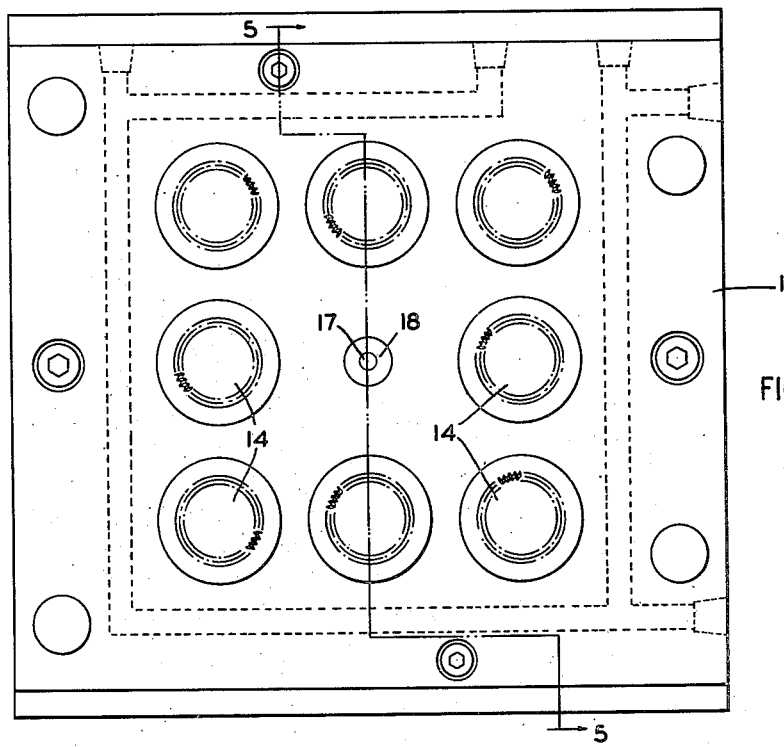
Fig. 3 is a plan view, from below of the other half of the said die assembly.
Figures 4, 5:
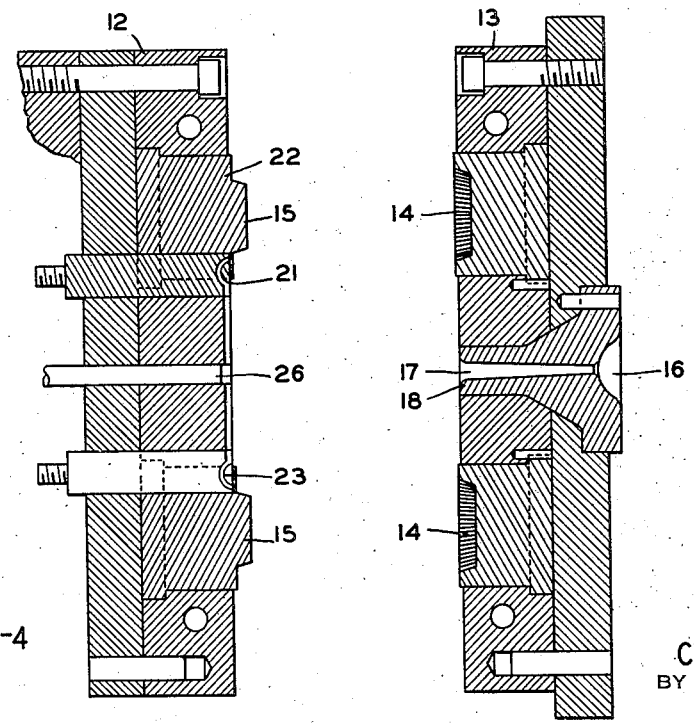
Fig. 4 is a section taken on the line 4—4 of Fig. 2.
Fig. 5 is a section taken on the line 5—5 of Fig. 3.
Figure 7:
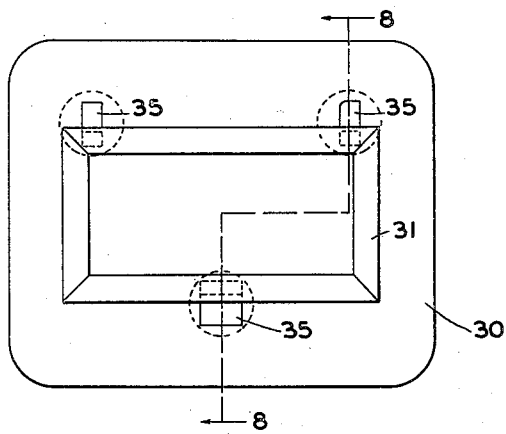
Fig. 7 is a plan view illustrating another modification of the invention, and showing the lower component of a two part die assembly, having a completed casting positioned thereon.
Figure 8:
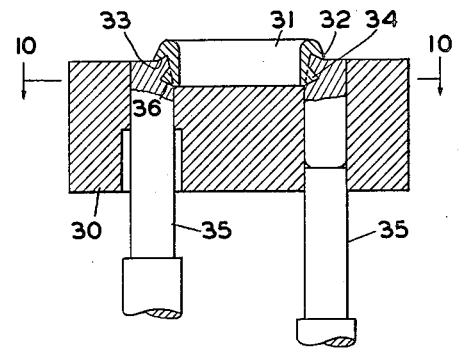
Fig. 8 is a section taken on the line 8—8 of Fig. 7.
Figure 10:
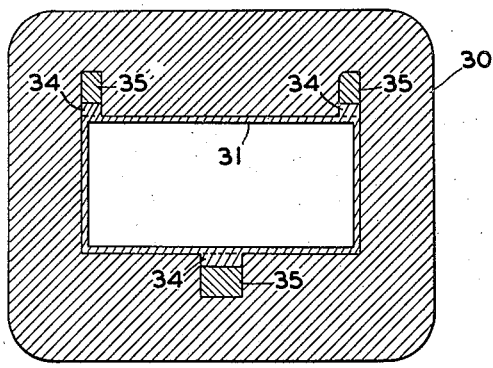
Fig. 10 is a section taken on the line 10—10 of Fig. 8.
Figure 9:
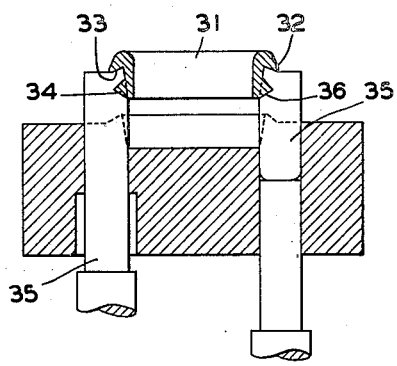
Fig. 9 is a view similar to Fig. 8 but showing the ejector pins in elevated position.

An ejector pin 20 is provided for each casting. The working face 21 of each ejector pin lies in the meeting plane of the dies (see Figs. 4 and 6) immediately adjacent the casting cavity. The aperture in which the pin reciprocates is machined partially in the inserts 22 which bear the core projection 15 and partially in the adjoining die member as best seen in Figs. 2 and 4. My invention comprises carrying the in-gate through the ejector pin and away from the meeting plane of the die halves as shown at 23 in Fig. 4 and indicated by the solidified contour of the article with gating material attached, as seen in Fig. 1 at 24. This is a radical departure from conventional practice and permits me to route the plastic material over and beyond the outer grooved periphery of the article, and into a portion of the article which may later be readily trimmed, cleaned, and finished since it represents a plane portion, easily accessible to saws or buffing mechanisms. The in-gate, as I term that portion of the gate immediately adjacent the die cavity is cut into one side 25 of the ejector pin so that it is not completely enclosed by the metal of the ejector pin, but one part of said in-gate is formed by the wall of the aperture in which the ejector pin operates. The in-gate routing through the ejector pin preferably follows a curved path with no sharp directional changes since this offers the path of least resistance to the flow of the plastic material. I am not aware, however, that anyone has previously disclosed methods or apparatus involving the passage of casting material, whether thermoplastic or metallic, through an in-gate in the ejector pin.

This gating design presents, among others, the following decided advantages. It preserves unimpaired the exterior accuracy of an article such as illustrated and it facilitates its ready removal from the dies, as will appear from the following description of the manner in which the invention is put in use.

In the operation of a standard press or die casting machine the die sections 12 and 13 are first moved into operative contact, the projections 15 being registered with depressions 14, and forming therebetween the casting cavity. An injection nozzle is next moved into operative position and a charge of plastic material is introduced into the sprue 17 whence it proceeds through gates 19 and in-gates 23, into the casting cavity. After solidification is complete the mold halves are separated, usually by raising the upper half which in this case is 13, although the arrangement of the parts is a matter of convenience in a pressure casting system. The invention is also applicable to a gravity casting system and in the latter instance the pouring sprue, 17, would necessarily, with this arrangement of the die halves, be in the upper half.

Either simultaneously with the separation of the mold halves, or immediately thereafter, the ejector pins 20 are moved inwardly by appropriate mechanism and, by reason of the solidified in-gate metal in the groove in the ejector pin the casting assembly is freed from its seat in the mold half 12 and is carried away from said seat, being now supported only on the ejector pins. An additional ejector pin 26 at the center of the radial group may be provided to assist in this operation and may be of conventional contour. Considering now the upper plan view of Fig. 2, it is a simple matter to rotate the cast assembly clockwise, freeing the in-gate sections from the ejector pins. The articles may now be freed from gating material, and trimmed and finished in conventional manner. A certain amount of solidification shrinkage sometimes takes place on the surface of the article adjacent to the entry point of the in-gate. In such cases I may design the die cavity contour so as to provide a little extra section thickness by means of a raised zone inset slightly from the grooved peripheral edge. This raised zone may be cleaned off by conventional machining methods when the article is being trimmed.

I have also used an essentially similar method and apparatus for molding articles with certain undercuts at spaced points on the external contour. In view of the basic concept disclosed herein it is a simple matter to so place a plurality of ejector pins in juxtaposition to those portions of the article containing the projections bounding the undercuts, that the ejector pins define the undercut portions. In the manner described above for the illustrated embodiment of my invention the mold is opened and the ejector pins carry the casting free of the mold into a position such that it may be freed from the pins by the proper directional movement. Under such conditions the in-gating may be conventional, or it may be carried through one or more additional ejector pins.

Figs. 7 to 10 inclusive show a die and ejector pin assembly for producing a casting such as just described. The drawings show the lower component 30 of a two part die assembly, the upper component not being shown. The die is suitably contoured to provide a casting cavity for producing a rectangular member 31 such as is used, for example, as a frame for a dial on an instrument panel. The frame is made from organic plastic material and is provided with a peripherally overhung flange 32 which defines thereunder an undercut groove 33. A plurality of spaced projections 34 are provided in juxtaposition to said overhanging flange 32, and the flange and projections define therebetween a space which is suited to receive a spring clip or other means for retaining said frame on said instrument panel. It is apparent that if said frame casting were defined wholly by said die member 30 it would be impossible to remove the completed casting from the die by reason of the undercut 33 and the projection 34. I have provided at the location of each projection an ejector pin 35 which is suitably grooved at 36 to define said projection, and which, to the extent of a portion of its lateral and top surfaces, constitutes a portion of the casting cavity wall defining both the projection and the undercut. After the casting operation, the upper die portion (not shown) is lifted, and the ejector pins 35 are elevated from the position shown in Fig. 8 to that in Fig. 9, thereby carrying the frame 31 clear of the lower die. It is thereafter a simple matter to slide the frame endwise in the direction of its longest dimension, permitting the projections 34 to slide out of grooves 36, completely clearing the article from the ejector pins.

I have used, indiscriminately, terminology applicable to the art of thermoplastic molding as well as to pressure and gravity molding in metal molds or dies as practiced in the metallic arts. The present invention was devised to solve a problem encountered in the field of thermoplastic molding but it is immediately obvious that it may be applied to other types of molding with little or no modification. For the same reason the ultimate article has been referred to as a casting and the terms "die" and "mold" have been used interchangeably to indicate the part or parts which carry the casting cavity. The terms "gate," "sprue" and "runner" have been used so loosely and interchangeably in the art that no particular distinctional significance attaches to any of them but, as before indicated, I have used "in-gate" to indicate the part of the casting fluid passageway which includes the divergence through the ejector pin.

What I claim is:

1. A mold for casting articles of the class described, said mold comprising separable mold sections having engaging faces providing a parting plane, said mold sections bounding said parting plane having portions defining therebetween a cavity, at least one reciprocable ejector pin in one of said mold sections, said ejector pin having a surface portion defining a part of the cavity wall, a gate for conducting molding material into said cavity, a portion of said gate lying in said parting plane, and an in-gate portion of said gate being located at least partially within said ejector pin through a zone diverging from said parting plane, and communicating with said cavity in a direction angularly inclined to said parting plane.

2. A mold for casting articles of the class described, said mold comprising separable mold sections having engaging faces providing a parting plane, said mold sections bounding said parting plane having portions defining therebetween a plurality of cavities, a plurality of reciprocable ejector pins in one of said mold sections, each said ejector pin having a surface portion defining a part of the cavity wall, a gate for conducting molding material into each said cavity, a portion of each said gate lying in said parting plane, and in-gate portions of each said gate being located at least partially within said ejector pins through a zone diverging from said parting plane, and communicating with said cavity in a direction angularly inclined to said parting plane.

3. A mold for casting an article having a peripheral surface portion thereof provided with a series of spaced grooves, said mold comprising separable mold sections having engaging faces providing a parting plane, said mold sections bounding said parting plane having portions defining therebetween a cavity, at least one reciprocable ejector pin in one of said mold sections, said ejector pin having a surface portion defining a part of the cavity wall, a gate for conducting molding material into said cavity, a portion of said gate lying in said parting plane and an in-gate portion of said gate being located at least partially within said ejector pin through a zone diverging from said parting plane, and communicating with said cavity in a direction angularly inclined to said parting plane and at a location spaced from that portion of the cavity confines which defines said grooved surface portion.

CHARLES L. POPP.